United States Patent [19]
Weber et al.

[11] Patent Number: 5,404,449
[45] Date of Patent: Apr. 4, 1995

[54] INTERFACE MODULE FOR SUPPORTING COMMUNICATION BETWEEN PROCESSOR SYSTEMS

[75] Inventors: Juergen Weber, Munich; Werner Nagler, Hohenschaeftlarn; Gerd Boecker, Munich, all of Germany

[73] Assignee: Siemens Aktiengesellschaft, Munich, Germany

[21] Appl. No.: 925,037

[22] Filed: Aug. 5, 1992

[30] Foreign Application Priority Data

Aug. 14, 1991 [EP] European Pat. Off. ........... 91113664

[51] Int. Cl.⁶ .................. G06F 7/02; H04L 12/00
[52] U.S. Cl. ................ 395/200; 364/DIG. 1; 364/228.1; 364/229.1; 364/259.2
[58] Field of Search ............ 395/200; 364/238.1, 364/242.95

[56] References Cited

U.S. PATENT DOCUMENTS

| | | | |
|---|---|---|---|
| 3,862,369 | 1/1975 | Hessenmuller et al. | 370/44 |
| 4,447,871 | 5/1984 | Terada et al. | 395/200 |
| 4,547,880 | 10/1985 | De Vita et al. | 370/91 |
| 4,633,461 | 12/1986 | Banton et al. | 370/58 |
| 4,710,922 | 12/1987 | Scott | 370/112 |
| 4,918,589 | 4/1990 | Floro et al. | 364/132 |
| 5,202,998 | 4/1993 | Yanes | 395/725 |
| 5,212,778 | 5/1993 | Dally et al. | 395/400 |
| 5,225,974 | 7/1993 | Mathews et al. | 395/275 |

FOREIGN PATENT DOCUMENTS

| | | |
|---|---|---|
| 0261947 | 3/1988 | European Pat. Off. . |
| 0282197 | 9/1988 | European Pat. Off. . |
| 0320041 | 6/1989 | European Pat. Off. . |
| 541266 | 10/1973 | Switzerland . |

OTHER PUBLICATIONS

"Hardware-Struktur und Hardware-Funktion des Digitalen Telefonsystems" by Pollhuber, E & I. Elektrotechnik und Informationstechni, vol. 106, No. 11, Nov. 1989, pp. 485-495.

*Primary Examiner*—Robert L. Richardson
*Assistant Examiner*—Lance Leonard Barry
*Attorney, Agent, or Firm*—Hill, Steadman & Simpson

[57] ABSTRACT

Interface module supports communication between processor systems. Communication between processor systems should chronologically burden the processor systems as little as possible. To this end, an interface module is utilized that supports the communication between two processor systems in the form of a process-parallel servicing of the two interfaces to the two processor systems.

5 Claims, 3 Drawing Sheets

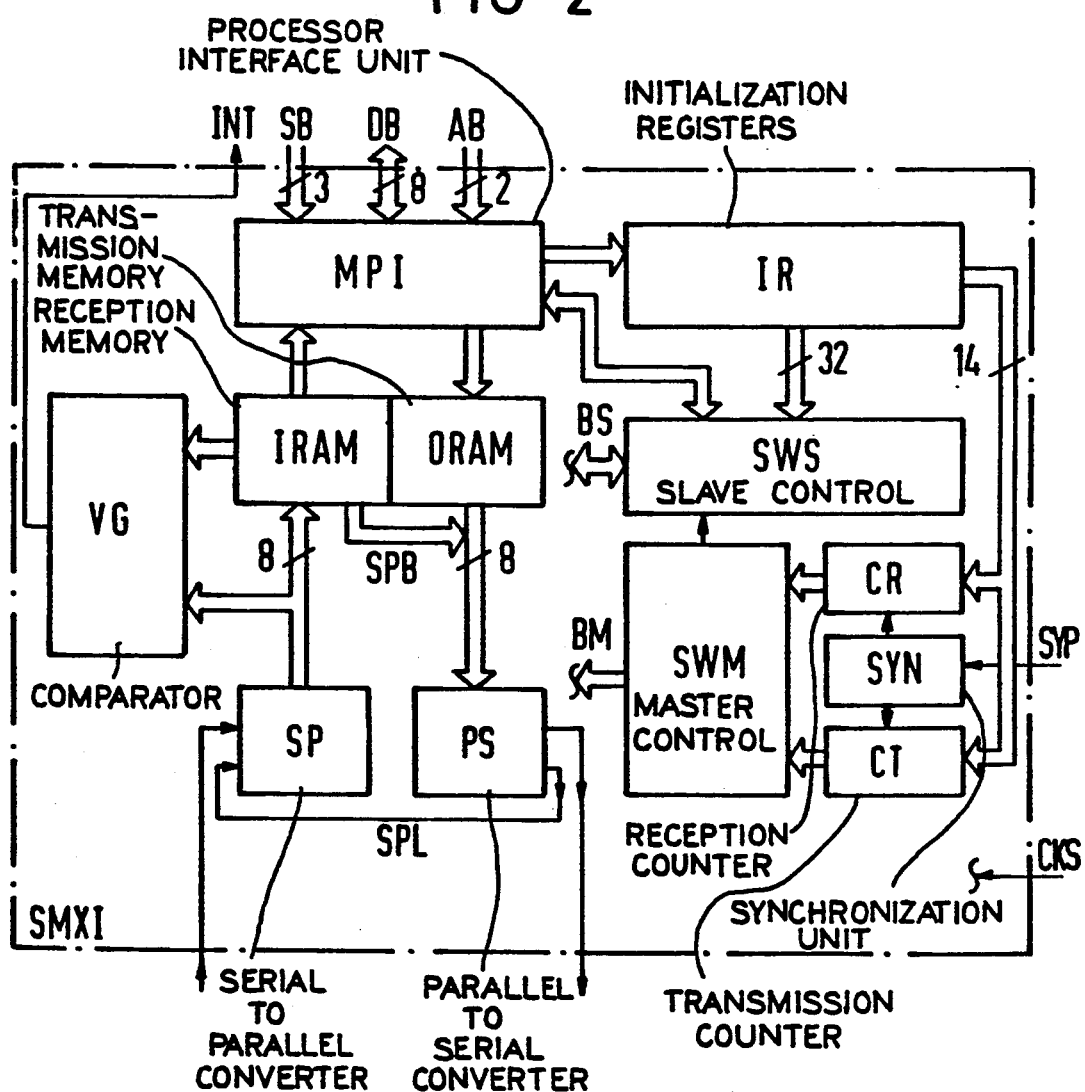

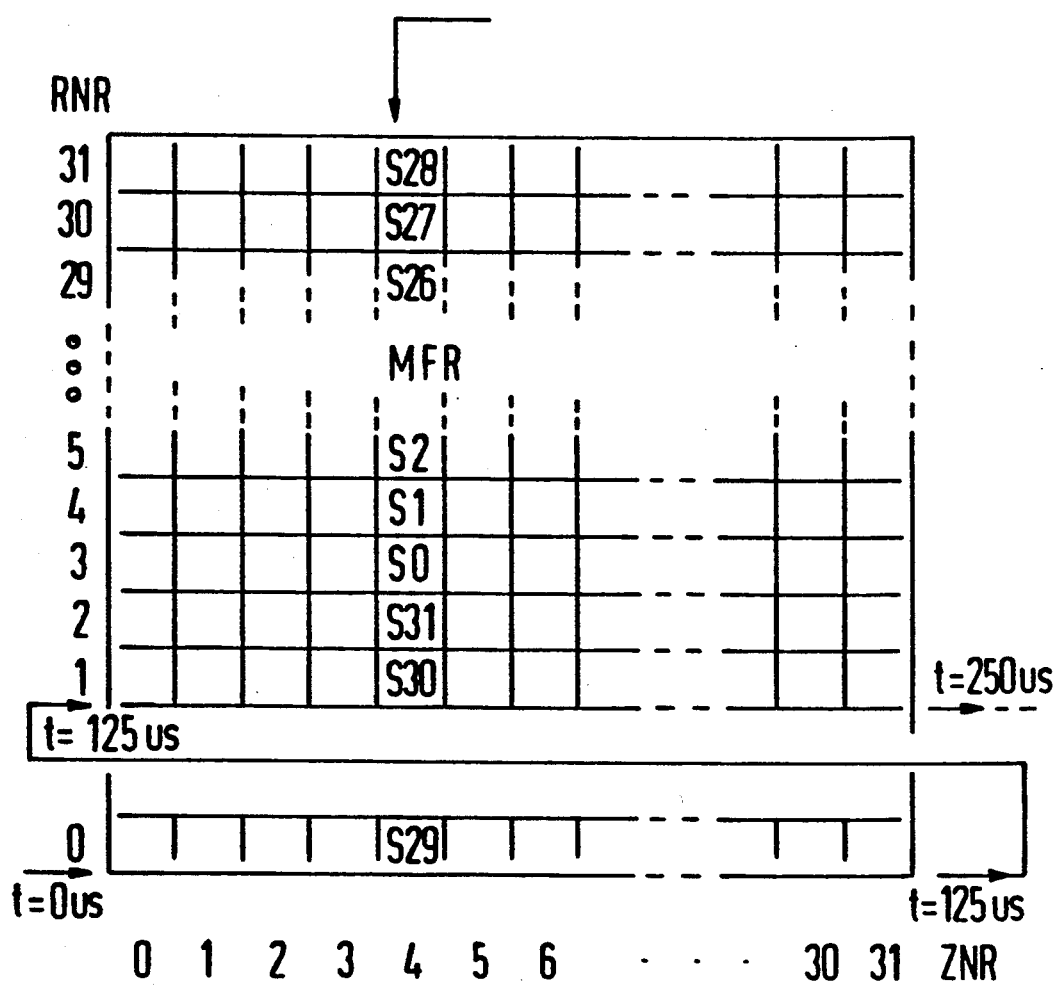

INTERFACE MODULE FOR SUPPORTING COMMUNICATION BETWEEN PROCESSOR SYSTEMS

BACKGROUND OF THE INVENTION

In peripheral line trunk groups of a digital telephone switching system, a protocol-oriented communication must be guaranteed between the processors that control a line trunk group.

FIG. 1 shows a physical connection structure between a group processor GP that controls an entire line trunk group LTG and a plurality of module processors MP that control various modules of a line trunk group. The group processor transmits and receives messages in the form of message blocks to or from various module processors via a message distribution system SMX according to a fixed pulse frame structure in time-division multiplex. An interface module SMXI serves as an interface between a module processor and the message distribution system. A working clock CKS is connected to the group processor GP and to the message distribution system SMX. A respective processor clock CKP is connected to each of the processor modules MP.

SUMMARY OF THE INVENTION

It is an object of the present invention to provide an interface module that supports communication between processors that control a line trunk group.

This object is achieved by an interface module for supporting communication between processor systems, having: an asynchronous parallel interface to one of the processor systems; a synchronous, serial interface to a message distribution system via which the processor systems communicate with one another; a memory unit for intermediate storage of a message stream between the one processor system and the message distribution system; and a control unit that controls the interface module dependent on the one processor system, the control unit having two controllers that service in parallel the two interfaces.

On the basis of two control units working independently of one another the messages received or transmitted at the two interfaces are stored in a memory unit in independent fashion or are readout from this memory unit in independent fashion. Thus, the message traffic at one interface can be decoupled from message traffic at the other interface.

An embodiment of the present invention, wherein initialization registers via which in combination with the control unit both the position as well as the length of the message blocks intermediately stored in the memory unit can be initialized, particularly has the advantage that the message processing of the interface module can be adapted in terms of software to various communication protocols of the processor systems and that the formation of sub-channels is enabled.

An interface module, wherein a comparator circuit compares to one another two successive message blocks received via the message distribution system and informs the processor system with an event signal only for inequality of the message blocks, whereupon the new message block is retrieved, particularly has the advantage that the resources of the processor system are only made use of when new messages are present.

In an advantageous development of the present invention a control register is provided via which the processor system can initiate the corresponding setting of the interface module for various special functions.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 2 is a block diagram depicting the internal organization of an interface module of the present invention; and FIG. 3 depicts a transmission superframe with a marked example for a transmission channel.

DESCRIPTION OF THE PREFERRED EMBODIMENT

Figure 1:
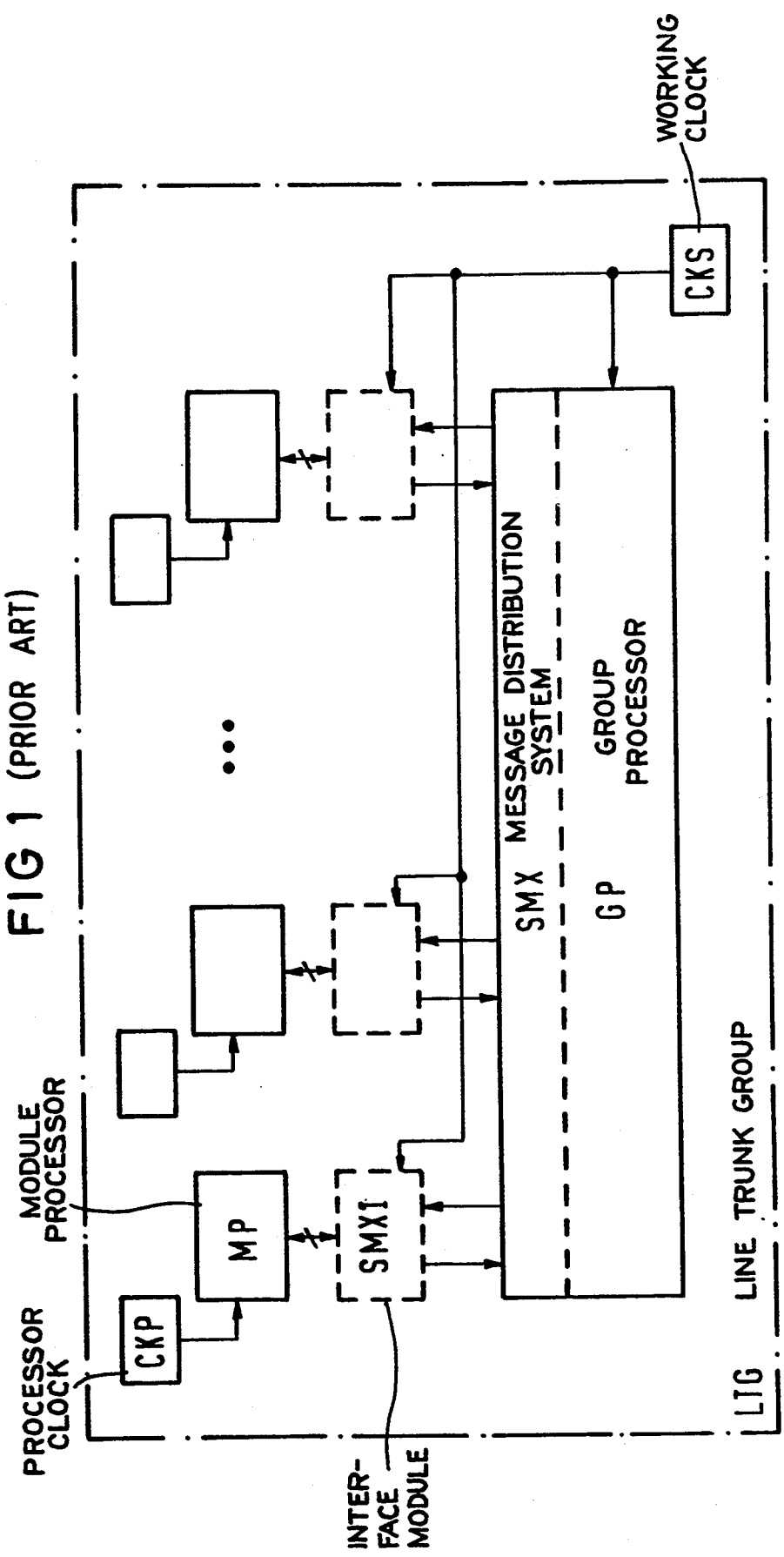
FIG. 1 is a block diagram depicting a prior art physical connection structure between a group processor that controls an entire line trunk group and a plurality of module processors that control various modules of a line trunk group.

The synchronous, serial interface to the message distribution system has a serial-to-parallel converter SP and a parallel-to-serial converter PS in the form of shift registers. Both shift registers process 2.048 Mbit/s serial data streams in both directions independently of one another, whereby respectively 8 bits are received and transmitted in the chronological spacing of 125 $\mu$sec. This corresponds to a nominal bit rate of 64 kbit/s and means that the interface module respectively receives and transmits a channel of a data stream with 32 channels. The number of the transmission channel is thereby independent of the number of the reception channel.

A working clock CKS of the interface module is 4.096 MHz and thus is twice the frequency of the transmission or reception clock. The transmission or reception clock must be synchronous with the working clock and can be externally acquired by dividing the working clock. The work cycle of the interface module is 4 msec. This corresponds to 16384 periods ($=2^{14}$) of the working clock CKS. The times for the transmission and reception of serial data can be selected independently of one another and can be placed at any arbitrary, negative edge of the working clock. The said times are defined relative to a synchronization pulse of a synchronization signal SYP that synchronizes the module in the superframe timing rate (4 msec). This is set forth in greater detail later.

The serial interface is controlled by a master control unit SWM in the form of a microprogram controller that, via a master bus BM, periodically addresses a transmission memory ORAM or a reception memory IRAM at the corresponding transmission or reception times. The transmission or reception memories are static RAM units that work independently of one another and that are each respectively organized with 32 words of respectively 8 bits (1 byte) each.

The serially received data from the group processor is stored byte-by-byte in the reception memory IRAM and is overwritten in the chronological spacing of 4 msec (circulating memory). The corresponding case applies to the transmission memory ORAM. The periodic points in time (time slots) at which data is to be transmitted and received at the serial interface is defined independently of one another by loading initialization registers IR. The period of the transmission and reception routines executed by the master controller is realized by two ring counters that are loaded independently of one another, namely a reception counter CR and a transmission counter CT. The loading of the counters to the respective starting values (0 through 16384) ensues with the internal synchronization pulse of the system of the synchronization signal SYP by loading the data from the corresponding initialization registers IR. A synchronization means SYN sees to the previous fault clearance of the synchronization signal.

All messages to the group processor and from the group processor are intermediately stored in the memory unit (transmission and reception memory) before the transmission and after the reception via the serial interface for the duration of what is referred to as a superframe of 4 msec. The interface module thus combines 32 successive frames of the message distribution system to form a superframe.

FIG. 3 shows a transmission superframe with a marked example for a transmission channel. The 32 frames of a transmission superframe MFR are arranged above one another according to their chronological sequence. Every frame has a frame number RNR and is composed of the time slots 0 through 31. One channel combines all time slots having the same time slot number ZNR over the 32 frames of the transmission superframe. The marked example shows the transmission channel number 5 corresponding to the time slot number 4. The time slot number is arbitrarily selected and can be 0 through 31 dependent on the initialization of the interface module.

The content of the addresses of the transmission memory ORAM referenced "S" is respectively entered into time slot number 4 of the transmission frames that follow one another from 0 through 31 after the parallel-to-serial conversion. During all other time slots, the interface module disconnects from the transmission line by "tristate" switching of an external buffer.

In what transmission frame the content of the memory element of the transmission memory having the address 0 is entered into the transmission time slot is defined by the initialization of the interface module in the corresponding initialization registers IR. The number of this frame is referred to as a relative transmitter frame number and can be 0 through 31. In FIG. 3, the relative transmission frame number is equal to 3. If follows therefrom that the content of the transmission memory address S0 is sent in the transmission frame 3, the content of the transmission memory address S1 is sent in the transmission frame 4 and the content of the transmission memory address S31 is sent in the transmission frame 2. The information in the transmission channel repeats at the timing rate of the superframe insofar as the module processor MP does not modify the content of the transmission memory.

Also, by initialization of a specific pointer register, the interface module can switch the external buffer high-impedance during time slots of the selected transmission channel. Every transmission memory address has a bit allocated to it in this pointer register. When this bit is set, then the transmission of the content of the corresponding transmission memory address is prevented, i.e. the external buffer remains high-impedance.

The connection of the interface module SMXI to the module processor MP occurs via a processor interface unit MPI. The processor interface unit has a plurality of directly addressable read and write registers to which the module processor has access via an 8 bit data bus DB. The selection of the processor interface unit by the module processor occurs via a control bus SB and via an address bus AB.

The write registers of the processor interface unit comprise at least a job register for loading a specific job for the interface module, a transmission register for forwarding data for execution of the corresponding job in the job register, a control register for controlling special functions of the interface module.

The read registers comprise at least a reception register for reading the data bytes from the reception memory IRAM, an interrupt register for reading what is referred to as a control byte that generated the interrupt.

With an interrupt signal INT, the interface module forwards an event to the module processor MP when a new message from the group processor GP was recognized by a comparator VG. Without such an event, the message in the reception memory IRAM is not even initially read by the module processor MP. This measure saves the module processor dynamic and administrative outlay.

A message or a message block is composed of one or more bytes. All messages with the exception of the "one-byte message" have the afore-mentioned control byte at the beginning followed by one or more information bytes and are terminated by a check byte.

In a "one-byte message", the one information byte is simultaneously marked and interpreted as a control byte in a control pointer register and as a check byte in a check pointer register. The two pointer registers belong to the group of the initialization registers IR.

The received control bytes are cyclically compared every 4 ms by the comparator VG with a "last-look mechanism". Given "new" control bytes, recognition of a modified message is made and, after the reception of the check byte (message complete), an event to the module processor is triggered by the interrupt routine. The interrupt is not cancelled until the modified control byte is read from the interrupt register of the processor interface unit MPI by the module processor MP.

Only the control byte of a message is checked for modifications by the comparator VG. Modifications in information bytes or check bytes are ignored. The drive of the comparator VG required for this purpose occurs via a slave control unit SWS that reads the control pointer register for this purpose.

The slave control unit SWS controls the parallel interface of the interface module dependent on jobs of the module processor MP that it receives via the job register of the processor interface unit MPI. Examples of such jobs are writing data bytes into the transmission memory ORAM via the transmission register or the initialization of initialization registers IR that also occurs via the transmission register.

For the communication of a plurality of messages, a transmission channel can be divided into sub-channels. To that end, for example, the reception memory IRAM is divided into areas that correspond to the freely definable sub-channels. Thus, for example, sub-channel 1 can be divided into the reception memory addresses 0 through 5, sub-channel 2 can be divided into the reception memory address 6 and sub-channel 3 can be divided into the reception memory address 7 through 29.

The interface module is informed of the position of the sub-channels via the corresponding initialization by the module processor MP. To this end, the latter marks the starting addresses of the sub-channels in the control pointer register and the ending addresses of the sub-channels in the check pointer register. Thus, in the selected example, the reception memory addresses 0, 6 and 7 are defined as control bytes and the reception memory addresses 5, 6 and 29 are defined as check bytes.

The reception memory can be divided into arbitrary, non-overlapping sub-channels. Areas can also be reserved (in the cited example, reception memory address 30 through 31) or an area can be composed of only one address (in the cited example, reception memory address 6).

Given message exchange in a sub-channel, the receiver is informed of the arrival of a new message (as in the case of only one channel) by designational modification of the first message byte (control byte). The interface module compares every received control byte to the corresponding control byte of the preceding superframe. When it recognizes a change in the bit pattern, then an interrupt is prepared. The interface module now waits until the last byte (check byte) of the message is transmitted in the sub-channel, then generates an interrupt signal INT and sets an interrupt flag in the status register of the processor interface unit MPI. When the channel is composed of only one address, then the interrupt is immediately triggered.

The slave control unit writes the content of the control byte that triggers an interrupt into the interrupt register and also writes the reception memory address of this control byte into the status register. These can be read by the module processor.

In order to guarantee that a new message is completely contained in a sub-channel having an address area greater than 1 given triggering of the interrupt, the transmitter of the message can only enter the modified control byte in its transmission memory after the entry of all other bytes of the sub-channel.

The two control units SWM and SWS are executed as two physically separate controllers that cooperate in the master-slave mode. A process-parallel servicing of the asynchronous, parallel interface and of the synchronous, serial interface is thus possible. Due to the phase-rigid multiplex frame of the message distribution system, the control of the serial interface has priority over the parallel interface and is therefore implemented by the master control unit SWM without taking the status of the asynchronous interface into consideration. The two separate control units, for example, can be realized by microprogram controllers or microcontrollers.

Although all of the jobs brought from the module processor to the interface module via the asynchronous interface can be independently handled by the slave control unit SWS, there are, of course, dependencies on the master control unit that, however, are independently coordinated by the master-slave mechanism and do not become visible in the environment of the interface module SMXI. Viewed externally, the two interfaces of the interface module are serviced independently of one another.

For testing and check purposes, the module processor can set two different data mirrors by jobs to the slave control unit via the control register of the processor interface unit. The first data mirror is implemented by means of a mirror bus SPB in that messages from the group processor are conducted back to it. The second data mirror is implemented by means of a mirror line SPL in that data from the module processor are conducted back to it.

All critical functions of the interface module can thus be tested or checked. Further, the module processor can initiate a resetting of the interface module via the control register.

Due to the multi-facetted aspect of the initialization of the interface module and the flexibility deriving therefrom, multi-facetted applications are conceivable. FIG. 1 showed the use of the interface module for supporting communication between the group processor GP and a plurality of module processors MP within a line trunk group LTG. A further possible application is the use of the interface module as a user-specific interface between suitable microprocessors and PCM30 primary multiplex systems.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An interface module for supporting communication between processor systems, comprising:
    an asynchronous parallel interface to one processor system of the processor systems;
    a synchronous serial interface to a message distribution system via which the processor systems communicate with one another;
    memory means for intermediate storage of a message stream between the one processor system and the message distribution system;
    control means for controlling the interface module dependent on the one processor system, said control means connected to said parallel interface, said serial interface and said memory means, the control means having two controllers that respectively service in parallel the asynchronous parallel interface and the synchronous serial interface;
    the message stream composed of message blocks, each of the message blocks having at least one check bit; and
    a comparator means for comparing to one another check bits of two successive message blocks received via the message distribution system and for informing the one processor system with an event signal, when said two compared check bits are not identical, whereupon the one processor system fetches that one of the two message blocks that was received last, said comparator means connected to said memory means.

2. The interface module according to claim 1, wherein the message stream is composed of message blocks and wherein the interface module further comprises initialization registers via which, in combination with the control means, both a position as well as a length of message blocks intermediately stored in the memory means are initialized, said initialization registers connected to said control means.

3. The interface module according to claim 1, wherein the interface module further comprises a control register via which the one processor system initiates settings of the interface module corresponding to special functions, said control register connected to said memory means and said control means.

4. An interface module for supporting communication between a plurality of processor systems, comprising:

- means for asynchronous parallel interfacing to one processor system of the plurality of processor systems;
- means for synchronous serial interfacing to a message distribution system via which the processor systems communicate with one another;
- memory means for intermediate storage of a message stream composed of message blocks between the one processor system and the message distribution system, each of the message blocks having at least a control byte;
- control means for controlling the interface module dependent on the one processor system, said control means connected to said parallel interface, said serial interface and said memory means, the control means having two controllers that respectively service in parallel the means for asynchronous parallel interfacing and the means for synchronous serial interfacing;
- initialization registers via which, in combination with the control means, initialize a position and a length of each of the message blocks intermediately stored in the memory means are initialized; and
- comparator means for comparing to one another check bits of two successive message blocks received via the message distribution system and, when said check bits are not identical, informing the one processor system with an event signal, said comparator means connected to said memory means, whereupon the one processor system fetches that one of the two message blocks that was received last.

5. The interface module according to claim 4, wherein the interface module further comprises a control register via which the one processor system initiates settings of the interface module corresponding to special functions, said control register connected to said memory means and said control means.

* * * * *